(12) United States Patent
Nye et al.

(10) Patent No.: US 8,590,962 B2
(45) Date of Patent: Nov. 26, 2013

(54) TRAILER WITH MULTI-POSITION PANELS

(75) Inventors: Stephen F. Nye, Syracuse, UT (US); Jacob Kearl, Plain City, UT (US); Lynn D. VanDyke, Layton, UT (US); James Harvey Schaffner, Ogden, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

(21) Appl. No.: 13/360,959

(22) Filed: Jan. 30, 2012

(65) Prior Publication Data
US 2012/0193942 A1 Aug. 2, 2012

Related U.S. Application Data

(60) Provisional application No. 61/437,535, filed on Jan. 28, 2011.

(51) Int. Cl.
B62D 33/04 (2006.01)
(52) U.S. Cl.
USPC ..................................... 296/186.4; 296/183.1

(58) Field of Classification Search
USPC ............... 296/34, 184.1, 186.1, 186.4, 183.1; 280/656
See application file for complete search history.

(56) References Cited

U.S. PATENT DOCUMENTS 7,100,970 B1 * 9/2006 Willis ........................ 296/183.1
7,165,779 B2 * 1/2007 Badger et al. ................. 280/656

* cited by examiner

*Primary Examiner* — Joseph Pape
*Assistant Examiner* — Dana Ivey
(74) *Attorney, Agent, or Firm* — Workman Nydegger

(57) ABSTRACT

In one example, a trailer is provided that includes a bed frame, a first panel at least indirectly connected to the bed frame, and a second panel at least indirectly connected to the bed frame. At least one of the first panel and the second panel is configured to be releasably secured in two different positions so as to at least partially define first and second configurations of the trailer, the first configuration being different from the second configuration.

22 Claims, 13 Drawing Sheets

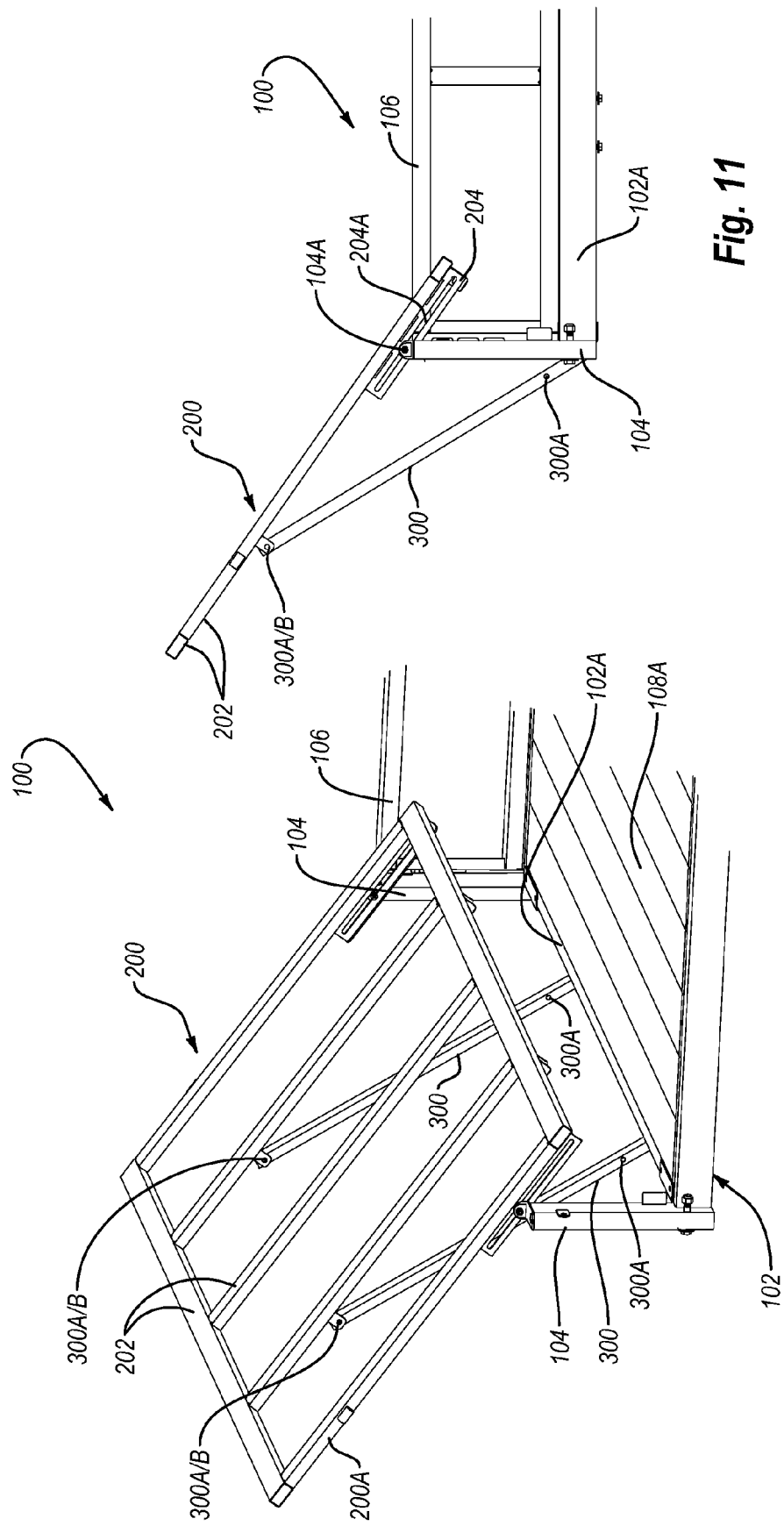

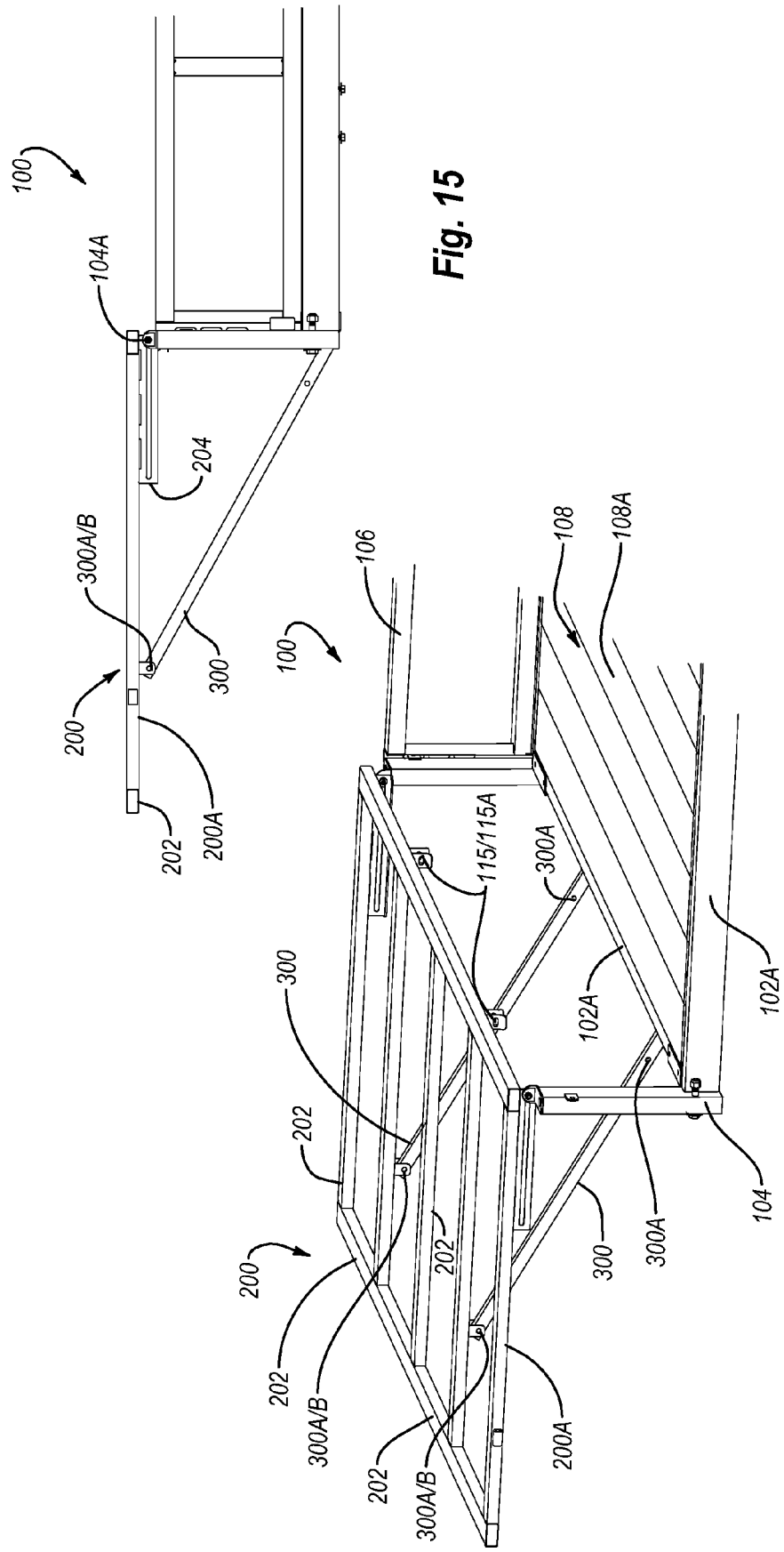

TRAILER WITH MULTI-POSITION PANELS

RELATED APPLICATIONS

This application hereby claims the benefit of U.S. Provisional Patent Application Ser. No. 61/437,535, entitled TRAILER WITH MULTI-POSITION PANELS, filed Jan. 28, 2011, and incorporated herein in its entirety by this reference.

BACKGROUND

1. Field of the Present Disclosure

The present disclosure is generally concerned with trailers. More specifically, the disclosed embodiments concern a trailer whose configuration can be modified. In at least some embodiments, the trailer may have a first configuration and may include one or more elements whose position can be changed so as to at least partially define a second trailer configuration. In at least some embodiments, such elements may include one or more movable panels. In some embodiments, one or more of the movable panels can be fixed in a plurality of different positions so as to at least partially define different configurations of the trailer.

2. Description of Related Art

A variety of different trailer types have been developed for use in any number of applications. While these trailers have proven useful in certain circumstances, a common limitation of many trailers is that they are made-for-the-purpose trailers. That is, such trailers typically are specifically designed to fulfill one particular function or purpose and are not well-suited for other uses. By way of example, a horse trailer is well suited for the transportation of horses, but the configuration of the horse trailer may not lend itself particularly well to other applications. Moreover, a typical horse trailer is constructed with a fixed configuration that cannot be readily modified, if at all, to suit the horse trailer for other uses.

Thus, if the owner of such a trailer has other needs that could be filled by a trailer, the owner may be compelled to purchase another trailer that is better suited to those needs, since the horse trailer would likely be of limited, or no, effectiveness in addressing those needs. While the owner could certainly do this, the expense in purchasing and maintaining an additional trailer could be significant.

As well, if the owner should need both the horse trailer and the additional trailer in the same place at the same time, such as on a camping trip for example, the need for two different trailers may present some logistical difficulties. For example, because many vehicles can only tow a single trailer at a time, at least two vehicles would likely be required for the camping trip. That is, one vehicle would be needed to tow the horse trailer, and one vehicle would be needed to tow the additional trailer. In addition to the logistical difficulties presented by this approach, increased fuel consumption and wear and tear on the vehicles would also result.

BRIEF SUMMARY OF SOME ASPECTS OF THE DISCLOSURE

Disclosed embodiments are concerned with a trailer whose configuration can be selectively modified. Some examples of the disclosed embodiments are set forth below. Such embodiments do not constitute an exhaustive summary of all possible embodiments, nor does this summary constitute an exhaustive list of all aspects of any particular embodiment(s). Rather, this summary simply presents selected aspects of some example embodiments. It should be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular effect(s)

In one example embodiment, a trailer is provided that may have a first configuration and may include one or more elements whose position can be changed so as to at least partially define a second trailer configuration.

In another example embodiment, a trailer is provided that may have a first configuration and may include one or more elements whose position may be changed so as to at least partially define a second trailer configuration. Such elements may include one or more movable panels.

In yet another example embodiment, a trailer is provided that may have a first configuration and may include one or more elements whose position may be changed so as to at least partially define a second trailer configuration. Such elements may include one or more movable panels. One or more of the movable panels may be releasably secured in a plurality of different positions so as to at least partially define different configurations of the trailer. Such configurations may include a camp trailer configuration and a utility trailer configuration, where one or more movable panels enable a utility trailer to be converted to a camp trailer and/or camp trailer to be converted to a utility trailer.

In a further example embodiment, a trailer is provided that may have a first configuration and may include one or more elements whose position can be changed so as to at least partially define a second trailer configuration. Such elements may include one or more movable panels. One or more of the movable panels may be releasably secured in a plurality of different positions so as to at least partially define different configurations of the trailer. At least one of the movable panels may be selectively configured to assume two or more different positions.

In a further example embodiment, a trailer is provided that may have a first configuration and may include one or more elements whose position can be changed so as to at least partially define a second trailer configuration. Such elements may include one or more movable panels. One or more of the movable panels can be fixed in a plurality of different positions so as to at least partially define different configurations of the trailer. At least one of the movable panels may be selectively configured to assume two or more different positions. In one of the positions, a movable panel may serve as a substantially vertical side of a trailer. In another of the positions, the movable panel may serve, for example, as a substantially horizontal workbench or substantially horizontal sleeping location.

BRIEF DESCRIPTION OF THE DRAWINGS

The appended drawings contain figures of some embodiments to further illustrate and clarify various aspects of the present disclosure. It will be appreciated that these drawings depict only some embodiments of the disclosure and are not intended to limits its scope. The disclosure will be described and explained with additional specificity and detail through the use of the accompanying drawings in which:

FIG. 10 is a rear detail perspective view of a tilted panel of an example trailer, and illustrating a brace, track piece, and pin;

FIG. 11 is a rear detail perspective view of a tilted panel of an example trailer;

FIG. 14 is a rear detail perspective view of a substantially horizontal panel of an example trailer, and illustrating a brace, track piece, and pin;

FIG. 15 is a rear detail perspective view of a substantially horizontal panel of an example trailer.

DETAILED DESCRIPTION OF SOME EXAMPLE EMBODIMENTS

The present disclosure is generally concerned with trailers. In brief, one example embodiment of a trailer may have a first configuration and may include one or more elements whose position can be changed so as to at least partially define a second trailer configuration.

General Aspects of Some Example Embodiments

In general, trailers disclosed herein may be constructed with a variety of components and materials including, but not limited to, wood, plastic (including blow-molded plastic structures and elements), composites, metals, and combinations of any of the foregoing. Suitable metals may include steel, aluminum, and aluminum alloys, although the skilled person will understand that a variety of other metals may be employed as well and the scope of the invention is not limited to the foregoing examples. Where metal is employed in the construction of the trailer, the metal elements of the trailer may take one or more forms including, but not limited to, square tube, rectangular tube, round tube, angles, flatbar, I-shapes, T-shapes, solid stock, and combinations of any of the foregoing.

Depending upon the material(s) employed in the construction of the trailer, a variety of methods and components may be used to connect, releasably or permanently, various elements of the trailer. For example, the various elements of a trailer within the scope of this disclosure may be attached to each other by any one or more of allied processes such as welding or brazing, and/or mechanically by way of fasteners such as bolts, screws, rivets, and nails for example.

Some, none, or all of portions of a trailer may be coated with paint or other materials. Surface treatments and textures may also be applied to portions of the trailers. One example surface treatment employs thermoplastic polyurethane and polyurea, although any other suitable materials may also be employed. At least some of such materials may serve to help prevent, or reduce, rust and corrosion.

Structural Aspects of Some Example Embodiments

Figure 1:
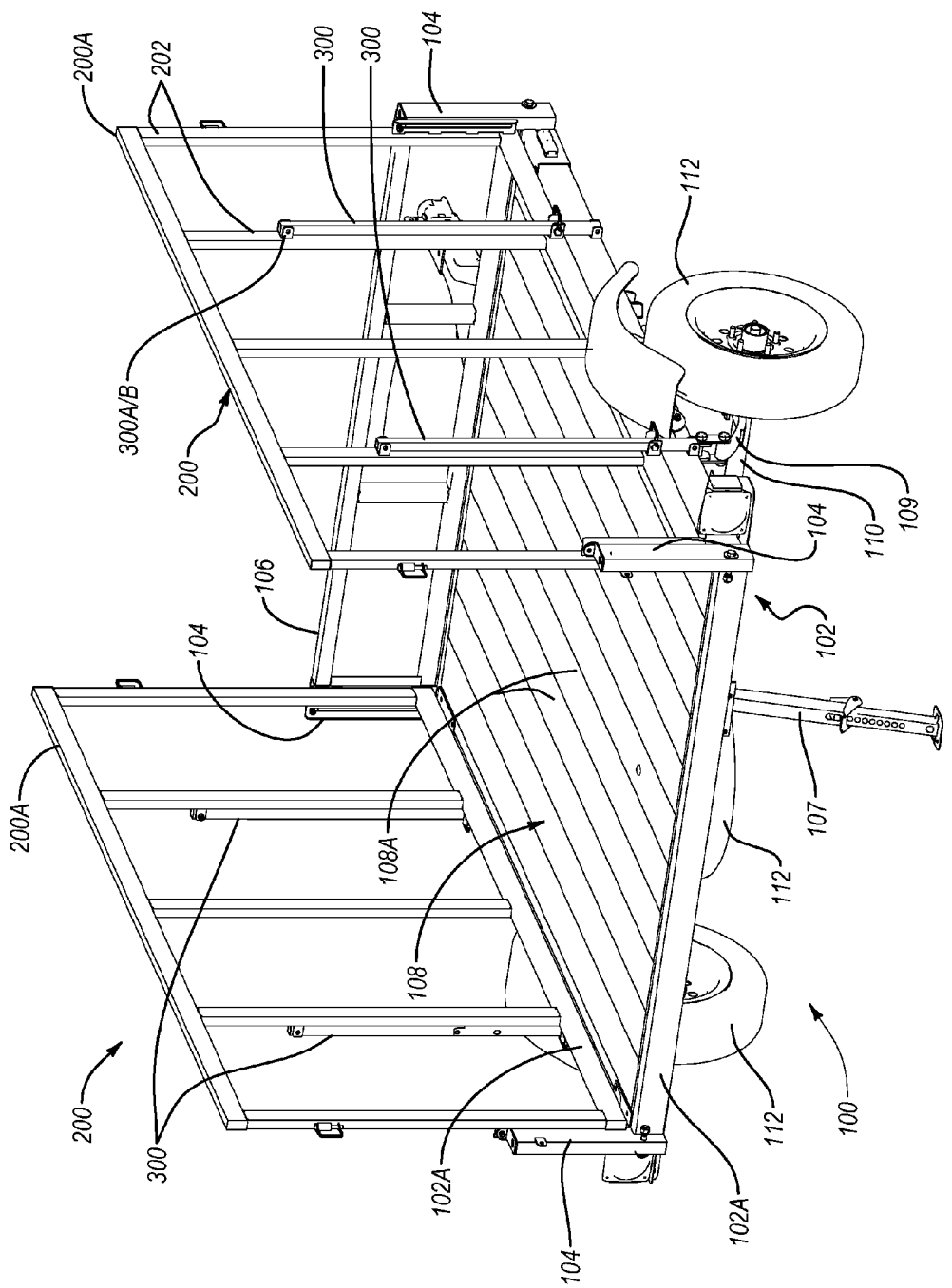
FIG. 1 is a rear perspective view of an example trailer with at least one movable panel in a substantially vertical position.
Figure 2:
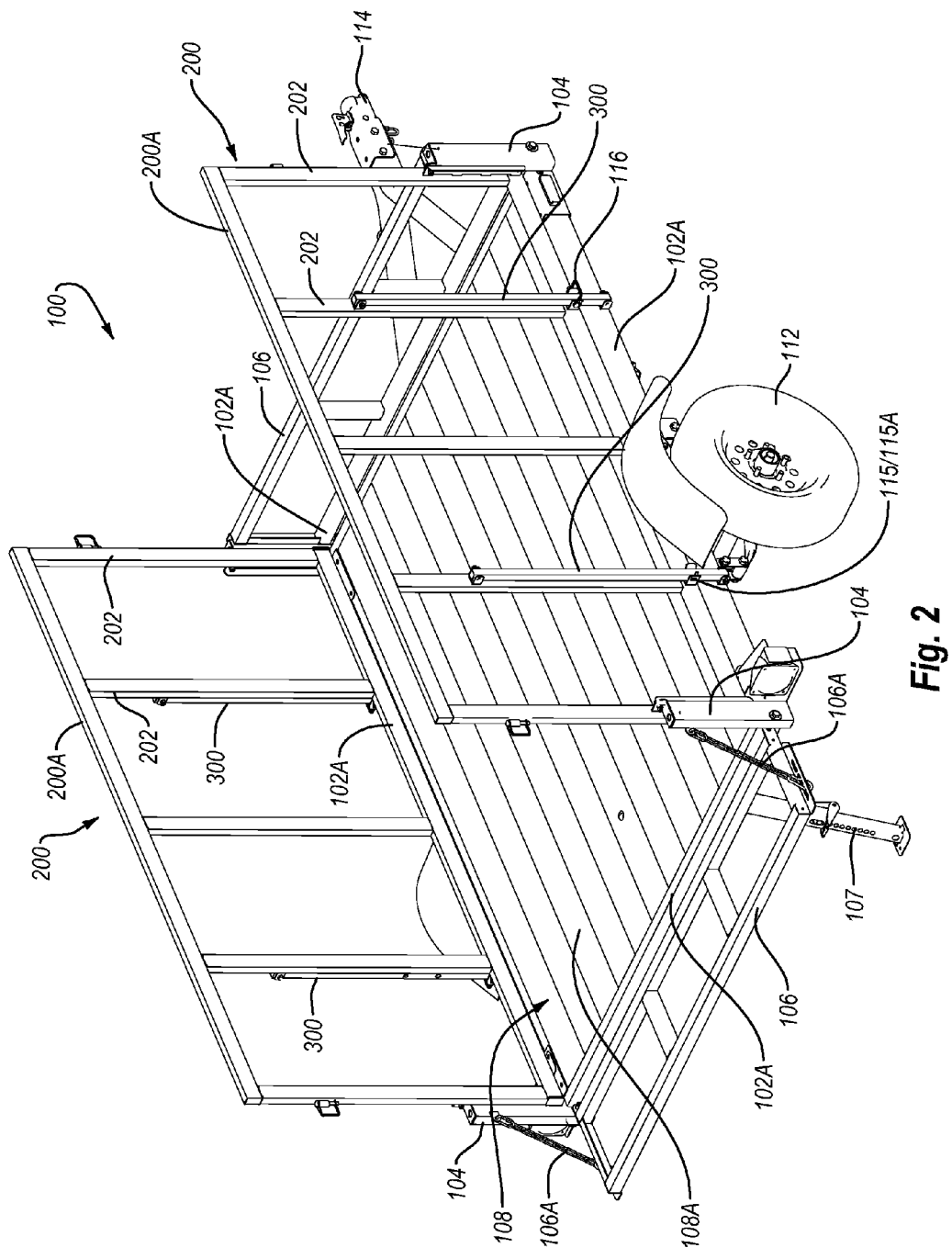
FIG. 2 is a rear perspective view of an example trailer with at least one movable panel in a substantially vertical position, and further including one or more gates.
Figure 3:
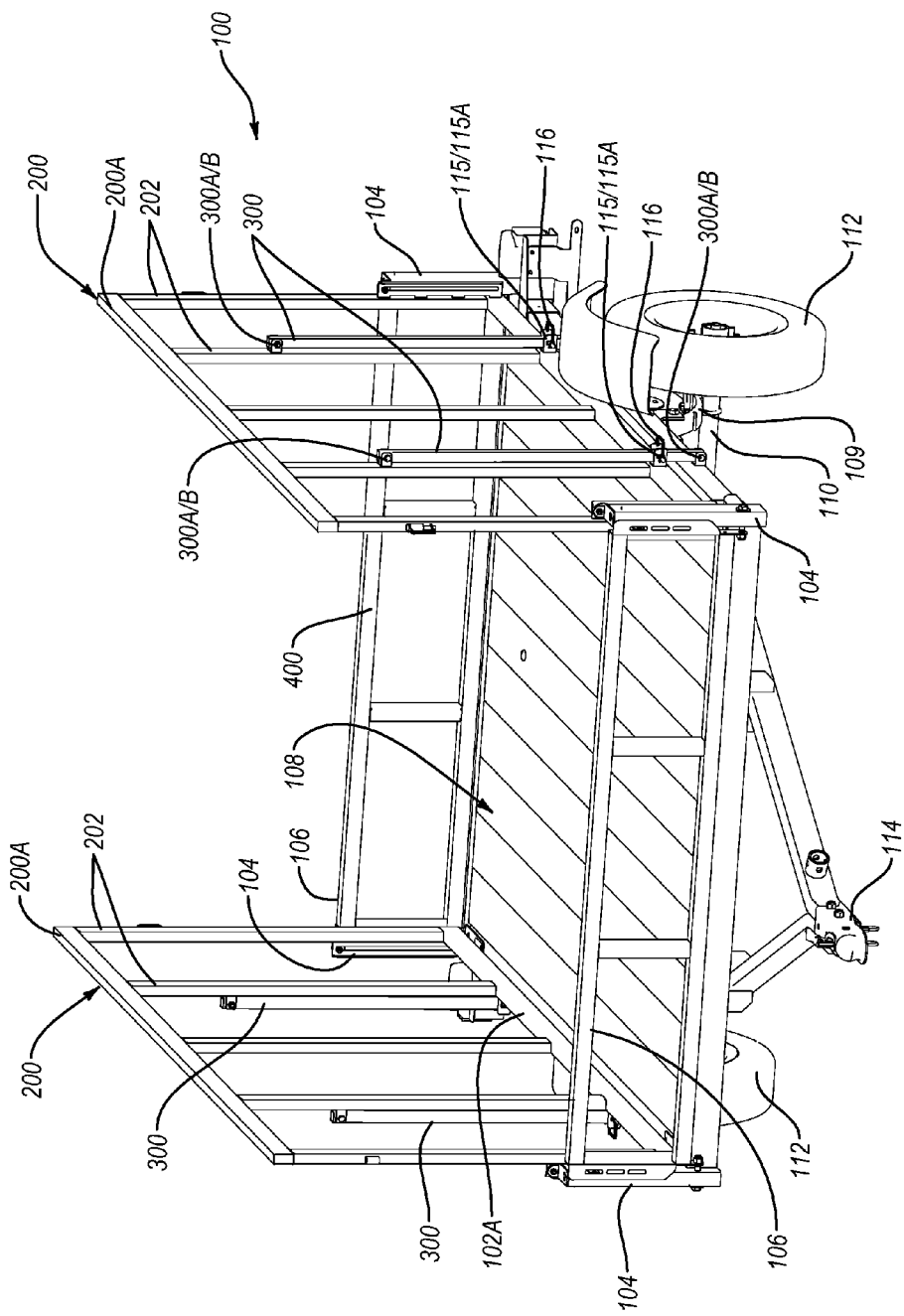
FIG. 3 is a front perspective view of an example trailer with at least one movable panel in a substantially vertical position, and further including one or more gates.

Directing attention now to FIGS. 1-3, an example trailer 100 is disclosed that includes a bed frame 102 comprising a plurality of bed frame members 102A. As noted above, one or more of the bed frame members 102A may be constructed with a variety of components and materials. Embodiments of the trailer, such as trailer 100, may also include one or more upright members 104 attached to the bed frame 102. As disclosed in greater detail elsewhere herein, the upright members 104 may support one or more movable elements, such as one or more of a panel, wall, or gate for example. In some embodiments, a gate 106 or wall may be provided at one or both ends of the trailer 100. The gate 106 may be at least partly secured to the trailer with a chain 106a, cable or similar device(s), and the gate 106 may be hinged to move through a desired range of motion, such as between about 0 degrees and about 180 degrees, or ranges therebetween.

In place of a gate, other embodiments may simply include a wall at one end of the trailer. Further, whether a gate or wall is employed at one end of the trailer, the other end of the trailer may be open. In another example embodiment, the trailer may include a wall at one end of the trailer and a gate at the other end. In a further embodiment, the trailer may include gates at both ends.

As disclosed in FIGS. 1-3, for example, the trailer 100 may further include a stand 107 whose height may be adjustable. The stand 107 may provide stability to the trailer 100, for example by preventing tipping of the trailer 100. The stand 107 may also be employed to tilt the trailer 100 at a desired angle, and to maintain the trailer 100 at that angle until tilting of the trailer 100 is no longer required.

With continuing reference to FIGS. 1-3, the trailer 100 may also include a bed 108 that comprises one or more bed members 108A. The bed 108 is supported by the bed frame 102. In one example embodiment, the bed members 108A are wooden. As well, the bottom of the trailer may include a suspension 109 attached, at least indirectly, to the bed frame 102. The suspension 109 may be connected to one or more axles 110, where each of the axles 110 supports two or more wheels 112. The trailer 100 may also include a tow hitch 114 at one end of the trailer 100.

Figure 4:
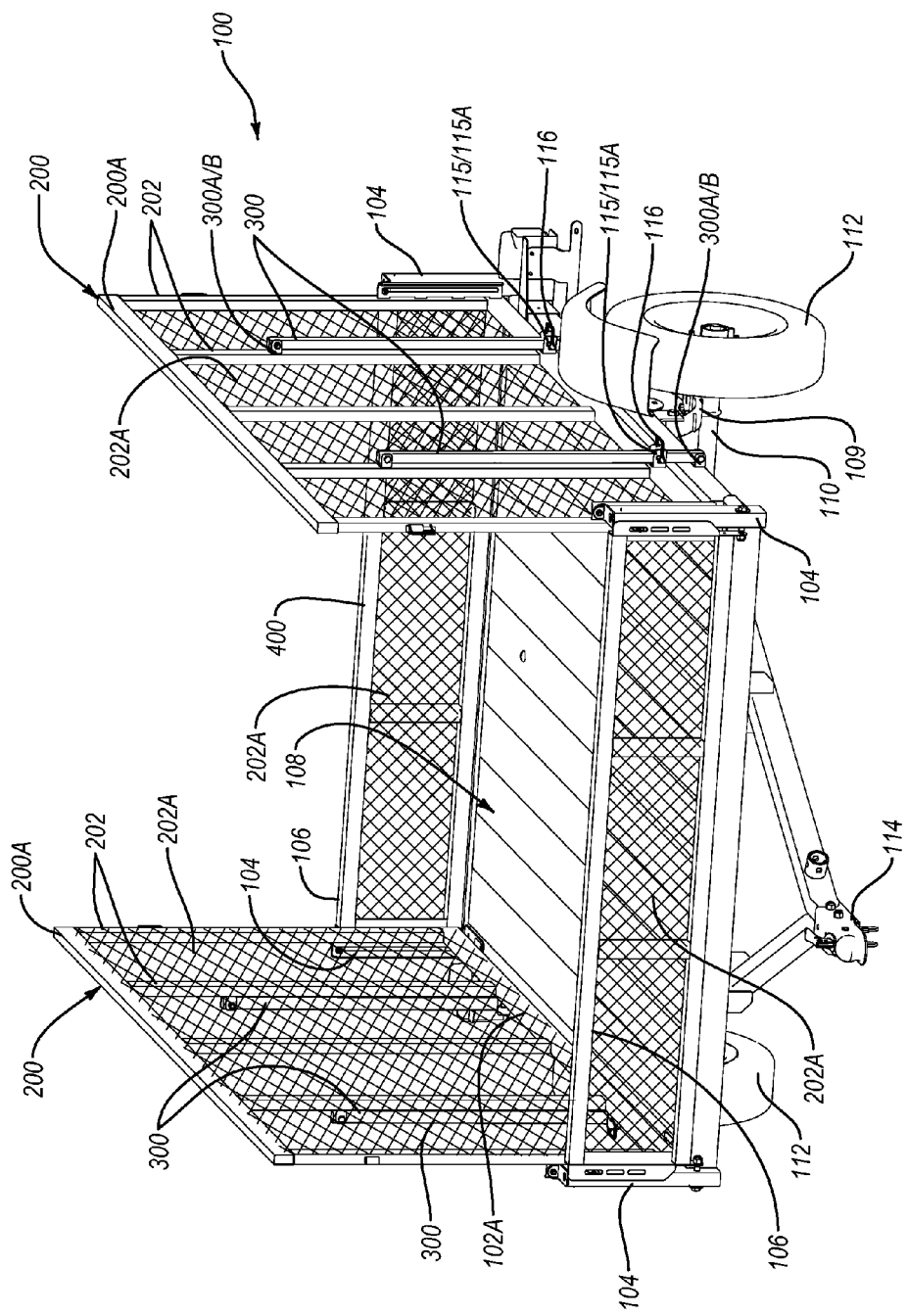
FIG. 4 is a front perspective view of an example trailer with at least one movable panel in a substantially vertical position, and further including one or more gates, and an expanded metal covering on one or more of the panels and/or gates.

With continued attention to FIGS. 1-3, and directing attention as well to FIG. 4, further details are provided concerning selected aspects of a trailer 100. In particular, one or more panels 200 and/or gates 106 may include an expanded metal covering 202a, although a variety of other coverings may additionally or alternatively be employed. Some example cover materials include, but are not limited to, sheet metal, diamond plate, plastic blow-molded panels, foam, wood, plastic, rubber, composites, or combinations of any of the foregoing. In some embodiments, one or more panels include slots, grooves, guides or other structures that serve to removably retain a cover on the panel.

As disclosed elsewhere herein, embodiments of a trailer may include one or more elements whose position can be changed so as to at least partially define a second trailer configuration. One non-limiting example of such an element is the panel 200 discussed below.

As disclosed in FIGS. 1-4, for example, the trailer 100 includes one or more panels 200. In the illustrated embodiment, the panels 200 are substantially the same length as the bed frame 102, but in other embodiments, one or more of the panels 200 could be shorter, or longer, than the bed frame 102. Likewise, the height of the panels 200 may vary. In some embodiments, two or more panels 200 are substantially the same height as each other while, in other embodiments, two or more panels 200 may have different respective heights. As well, embodiments of the trailer may include more, or fewer, than two panels 200. By way of example, a trailer may include front and/or rear panels in addition, or as an alternative, to one or more side panels.

Figure 5:
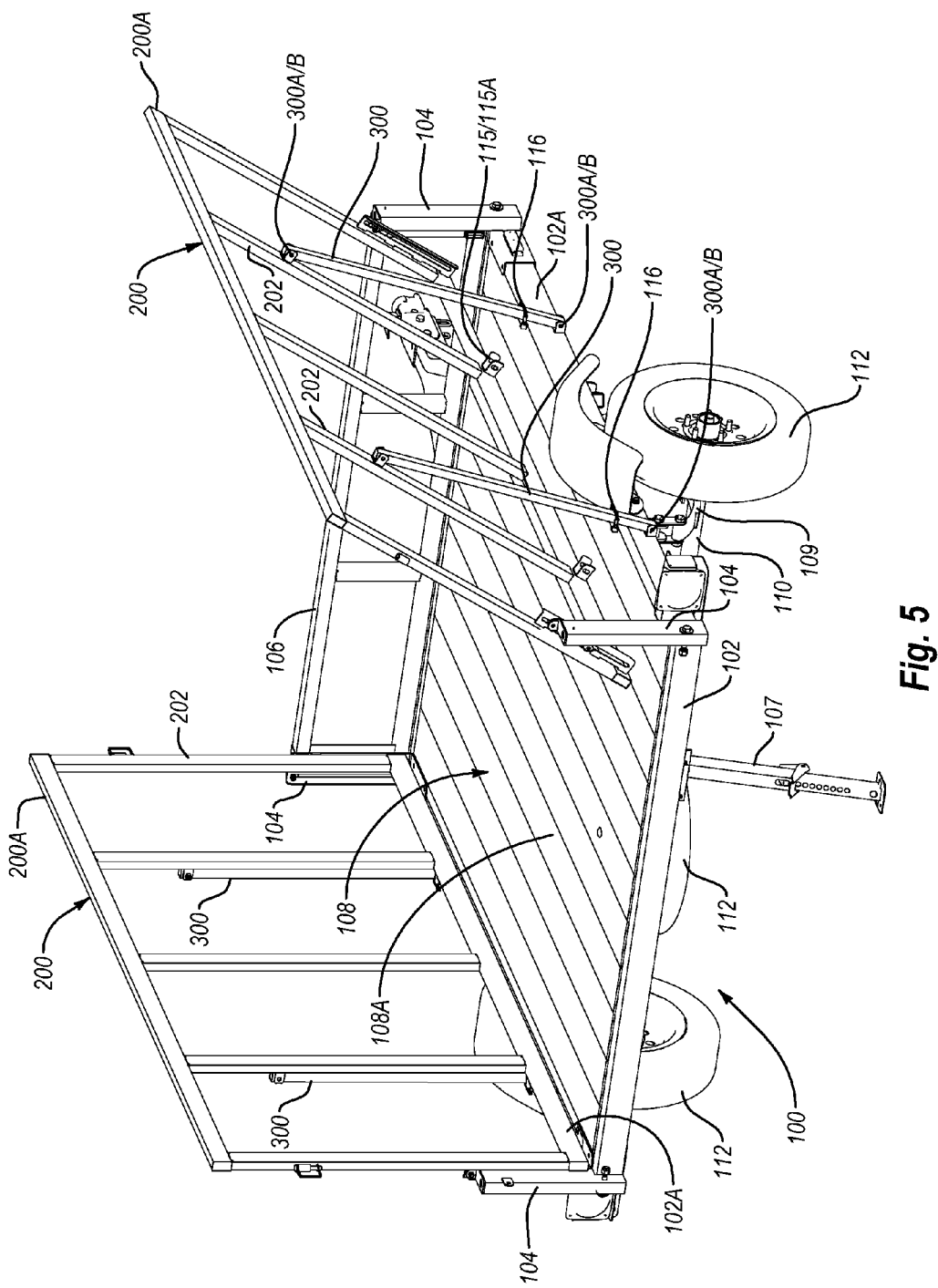
FIG. 5 is rear perspective view of an example trailer with a movable panel in transition between a substantially vertical position and a substantially horizontal position.
Figure 6:
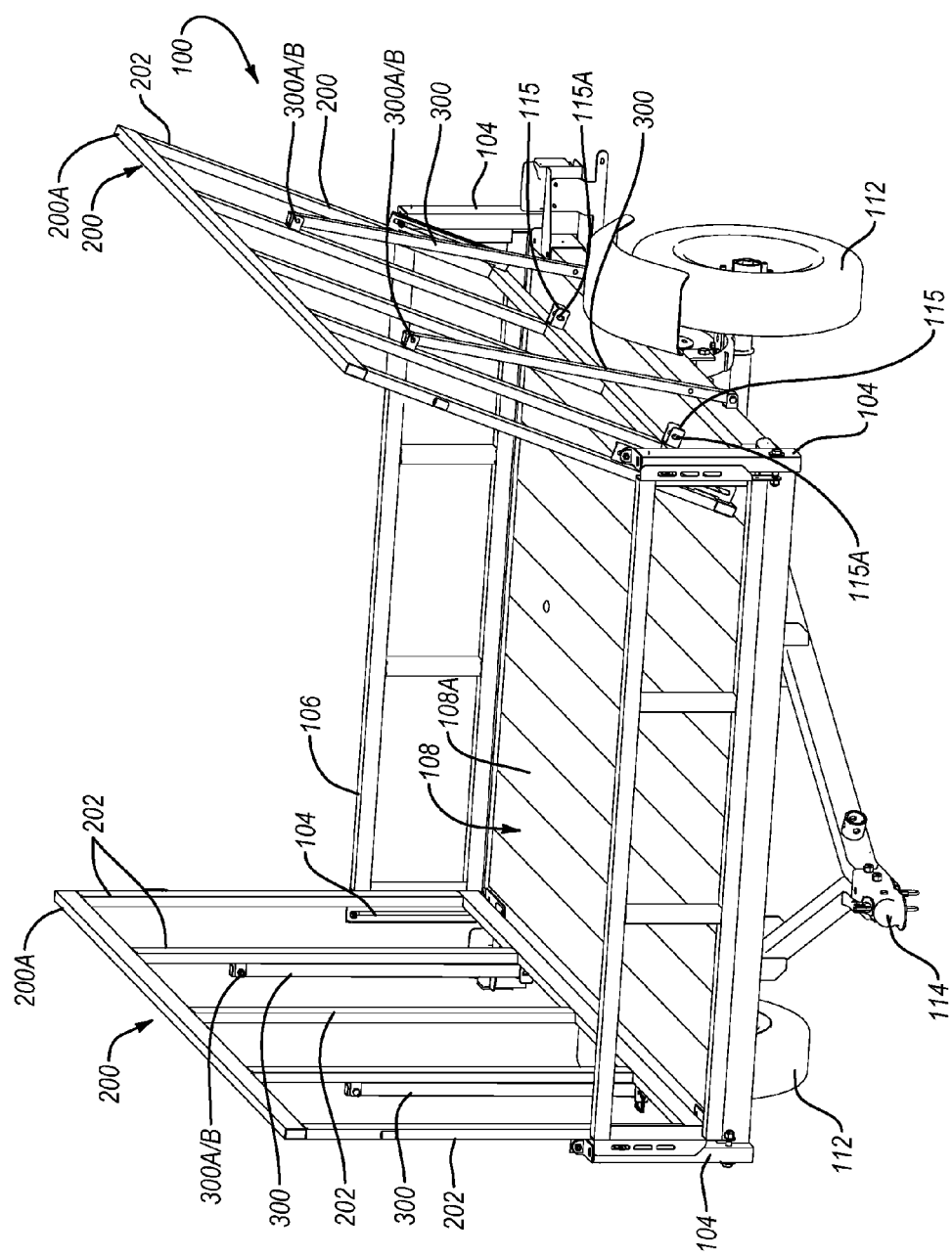
FIG. 6 is front perspective view of an example trailer with a movable panel in transition between a substantially vertical position and a substantially horizontal position.
Figure 7:
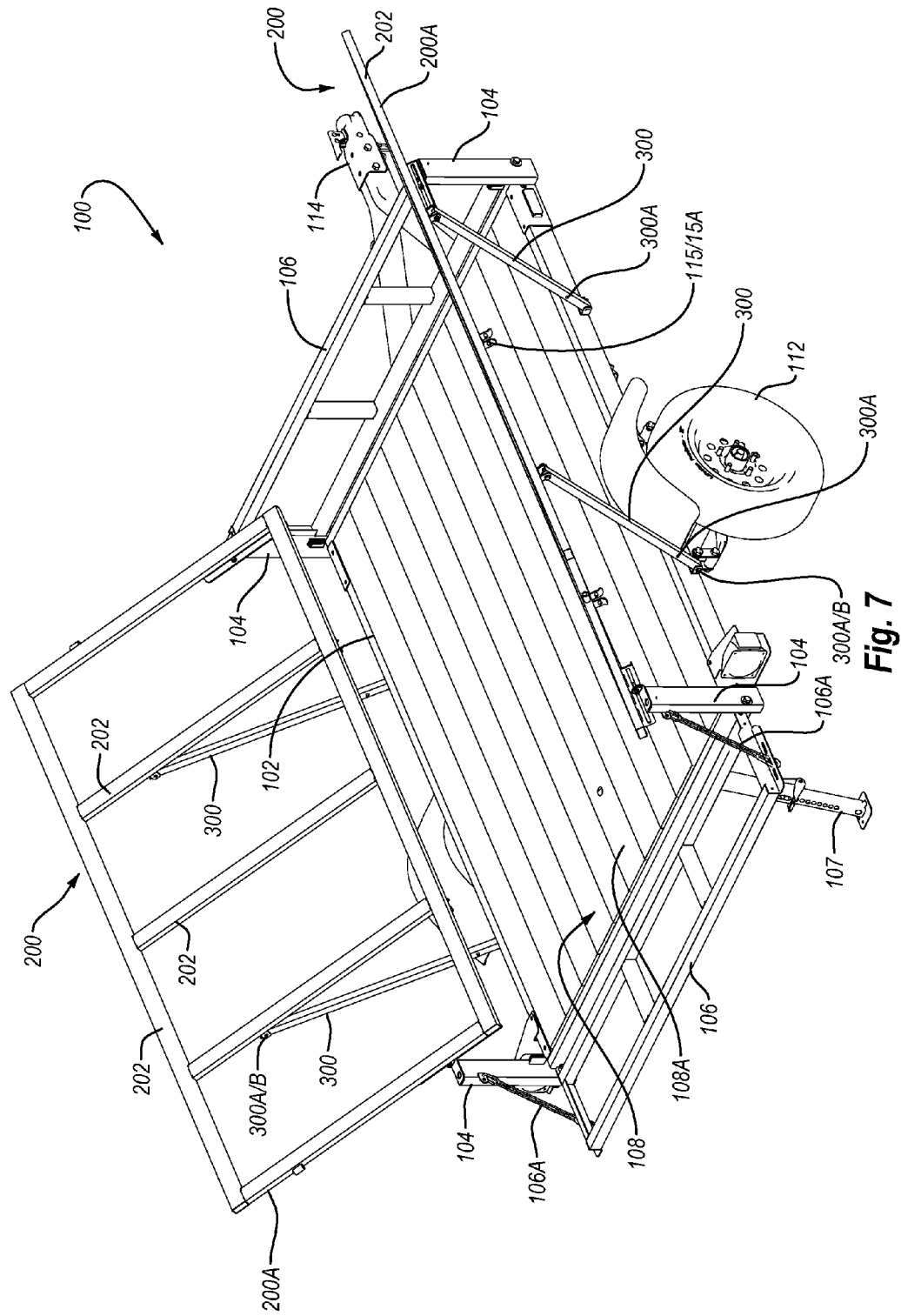
FIG. 7 is rear perspective view of an example trailer with a pair of movable panels in transition between a substantially vertical position and a substantially horizontal position, and further including two gates.
Figure 8:
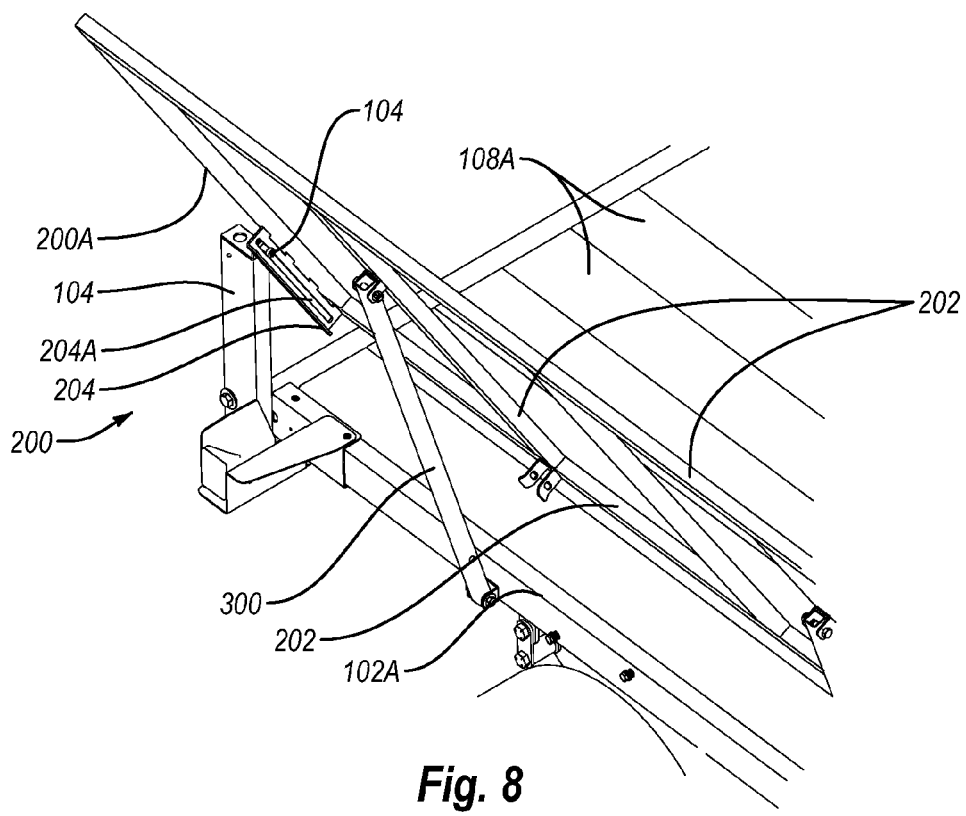
FIG. 8 is a front detail perspective view of a tilted panel of an example trailer.
Figure 9:
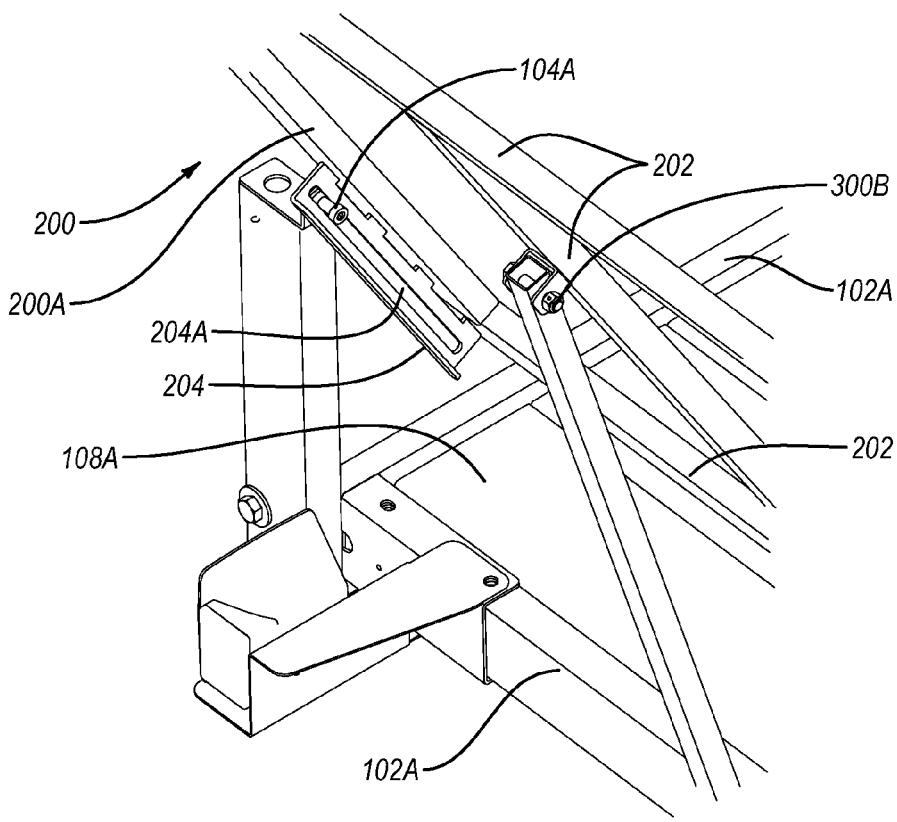
FIG. 9 is a front detail perspective view of a tilted panel of an example trailer, and illustrating a brace, track piece, and pin.
Figure 12:
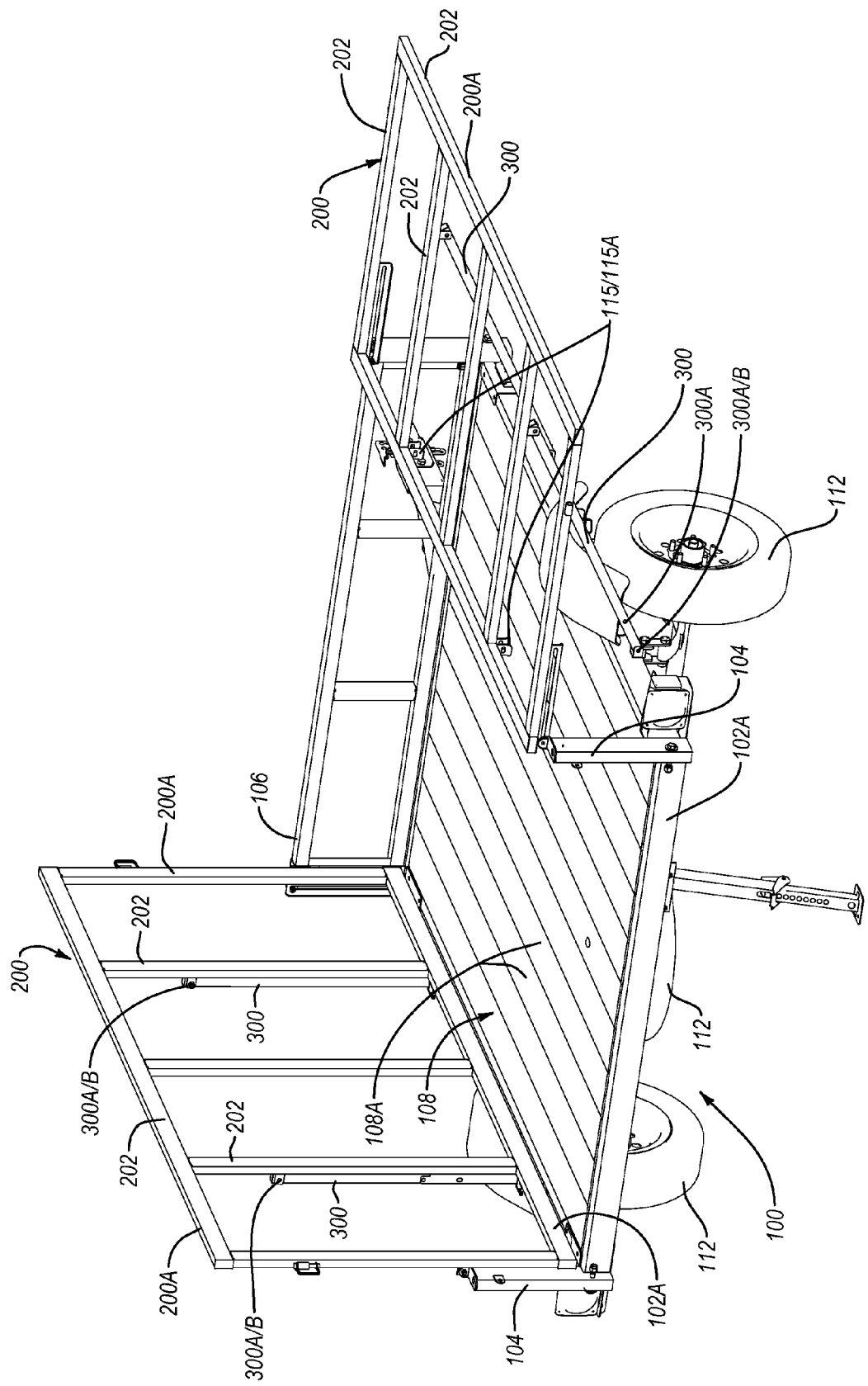
FIG. 12 is a rear perspective view of an example trailer with a movable panel in a substantially horizontal position, and with another movable panel in a substantially vertical position.
Figure 13:
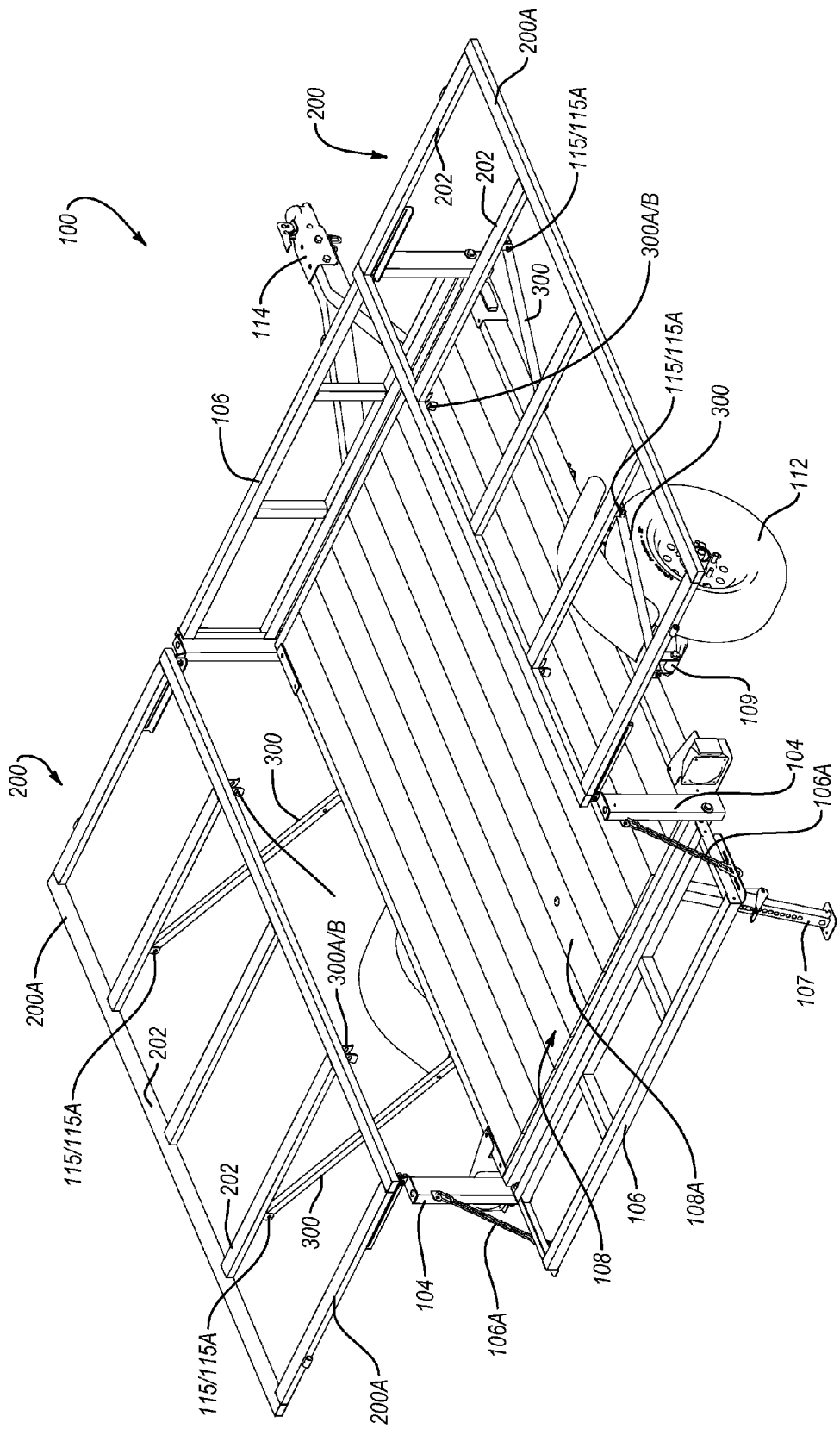
FIG. 13 is a rear perspective view of an example trailer with two panels in a substantially horizontal position.

As collectively disclosed by FIGS. 5-15, and with reference initially to FIGS. 5-7 as well as continuing reference to FIGS. 1-4, at least one of the panels 200 is movable to, and between, a variety of different positions. In some embodiments, two or more panels 200 are movable. Moreover, a movable panel 200 may be configured to assume two or more different positions. As exemplified by FIGS. 1-4, some embodiments of the panel 200 can be positioned, at least, in a substantially vertical position, and in a substantially horizontal position as disclosed in FIGS. 12-15. In further embodiments, the panel 200 may be positioned in additional, or alternative, positions.

In at least some embodiments, one or more panels can be releasably secured in one or more of the different positions. In this way, the trailer 100 configuration can be selectively changed. That is, in one example embodiment, a trailer is provided that may assume a first configuration that corresponds with a first position of one or more moveable elements, such as panels, and the trailer may further assume a second configuration that corresponds with a second position of one or more movable elements, such as panels. For example, in FIGS. 1-4, where the panels 200 are in a substantially vertical position, the panels 200 serve to at least partially define a utility trailer configuration where the panels are positioned to help confine cargo to be carried by the trailer 100.

As another example, where one or more of the panels 200 is in a substantially horizontal position, as in FIGS. 12-15, the panels 200 serve to at least partially define a configuration where a user can use the substantially horizontal panel 200, suitably covered, as a workbench or other work surface. This trailer configuration may be useful, for example, to a plumber who needs a horizontal surface on which to mount a pipe cutter and vise. This trailer configuration may also be useful on a camping trip, for example, where the substantially horizontal panel, suitably covered, could serve as a table, or sleeping platform. More generally, this trailer configuration would be useful in any application where a substantially horizontal platform is needed.

As the foregoing examples illustrate, embodiments within the scope of this disclosure may be advantageous insofar as they enable a user having a single trailer to readily define a plurality of different trailer configurations, depending upon the need at hand.

Directing more particular attention now to FIGS. 5-9, which disclose one or more panels 200 in transition between a substantially vertical position and a substantially horizontal position, further details are provided concerning selected aspects of an example embodiment. As indicated in those figures, the panel 200 includes a frame 200A comprising a plurality of frame members 202. In at least one embodiment, the frame members 202 take the form of steel square/rectangular tube pieces that are welded together although, as noted elsewhere herein, elements of the trailer may be constructed of additional, or alternative, materials.

As indicated in FIGS. 4 and 5, a frame member 202 may include a track piece 204 defining a slot 204A which receives a pin 104A that is connected to upright member 104. As best shown in FIGS. 5 and 6, the other end of the panel 200 may include an additional frame member 202 that likewise includes a track piece 204 having a slot 204A which receives a corresponding pin 104A that is attached to a corresponding upright member 104. As discussed in greater detail below, the track pieces 204 define a range of motion for the panel 200 and enable the panel 200 to slide and rotate relative to the pin 104A and the upright member 104. The vertical location of the pin(s) 104A may be modified to adjust the height of the panel 200 above the frame bed 102 when the panel 200 is in the substantially horizontal position. In some embodiments, the vertical position of the pin(s) 104A may be adjustable.

As indicated by the foregoing, the track piece 204 and pin 104a collectively form an example structural implementation of a means for repositioning. As disclosed herein, the means for repositioning performs a plurality of functions, including enabling the position of the panel 200 to be changed. It should be noted however, that alternative, or additional, structural elements may be employed to implement one or more aspects of the functionality of track piece 204 and pin 104a. Accordingly, the scope of the disclosure should not be construed to be limited to this particular structural implementation. Rather, any other structure(s) capable of performing one or more aspects of the functionality of track piece 204 and pin 104a may be employed and, accordingly, such structure(s) are contemplated as being within the scope of this disclosure. As well, such a means for repositioning is not confined for use with trailers but could be used in applications such as work boxes, and work benches, for example that may employ panels such as are disclosed herein.

With particular reference now to FIGS. 2 and 5-7, the panel 200 may be releasably secured in, at least, a substantially vertical position and in a substantially horizontal position. To aid in securing the panel 200 in the substantially vertical position, the trailer 100 may include one or more brackets 115, which may be U-shaped, that are configured and arranged to engage a corresponding brace 300, such as by receiving a portion of the brace 300 within the bracket 115. In particular, as the panel 200 is rotated to the substantially vertical position, the brace 300 is received in the opening defined by the bracket 115. A pin 116, lock, bolt or other element (not shown) of comparable functionality can then be inserted through holes 115a defined by the bracket 115 so as to releasably retain the brace 300 within the bracket 115. The panel 200 can be unlocked by removing the pin 116, lock, bolt or other element from the holes 115a. Among other things, this configuration may help prevent vertical motion of the panel 200, and also help prevent rotation of the panel 200 away from the substantially vertical position toward the substantially horizontal position.

Rotation of the panel 200 in the opposite direction, that is, away from the substantially horizontal position toward the interior of the trailer 100 may be limited or prevented in a variety of ways. For example, a lip (not shown) provided on one or more bed frame members 102A and extending upward past the lowest point of the panel 200 may serve to prevent such rotation. Alternatively, one or more latches attached to one or more bed frame members 102A and/or upright members 104 may be biased, such as by a spring for example, so as to releasably engage a frame member 202 of the panel 200 and thereby constrain the motion of the panel 200. The aforementioned lip(s), and latch(es), are example embodiments of a securing mechanism that can be used to secure the panel 200 in a desired position.

As noted above, the trailer 100 may include one or more braces 300. With particular reference now to FIGS. 7-11, the example embodiment of trailer 100 may include one or more braces 300 connected to the bed frame 102 and the panel 200. In one embodiment, the braces 300 are constructed of square or rectangular steel tube although, as noted elsewhere herein, components of embodiments of the trailer may be constructed of any of a variety of other materials and configurations. As indicated in the example of FIG. 3, the braces 300 serve, at least, to support the panel 200 when the panel 200 is deployed in the substantially horizontal position. Moreover, the braces 300 may prevent the panel 200 from rotation below a substantially horizontal position.

The braces 300 may be rotatably connected, directly or indirectly, to the bed frame 102 and the panel 200 so that the braces 300 are able to move in unison with the panel 200 relative to the bed frame 102. The rotatable connection between the braces 300, and bed frame 102 and panel 200 may comprise pins, bolts, rivet and/or any other element(s) that would permit the desired movement of the braces 300 relative to the bed frame 102 and the panel 200. In the particular example of FIGS. 7-9, the braces 300 may define a hole 300a at each of the upper and lower end of the brace 300. The hole 300a at the upper end of the brace 300 is configured and arranged to with a hole in corresponding structure of a frame member 202 such that a pin 300b can be passed through the two holes so as to rotatably connect the brace 300 to the frame member 202. In similar fashion, the hole 300a at the lower end of the brace 300 is configured and arranged to with a hole in corresponding structure of a bed frame member 102a such that a pin 300b can be passed through the two holes so as to rotatably connect the brace 300 to the bed frame member 102a.

In some embodiments, one or more telescoping members (not shown) may be used in place of one or more of the braces 300. In some embodiments, one more of the braces may be configured so that one end of the brace is detachable from the bed frame 102 or the panel 200. In some embodiments, one or more of the braces may be configured so that both ends of the brace are detachable, for example, from the bed frame 102 and the panel 200.

Figure 16:
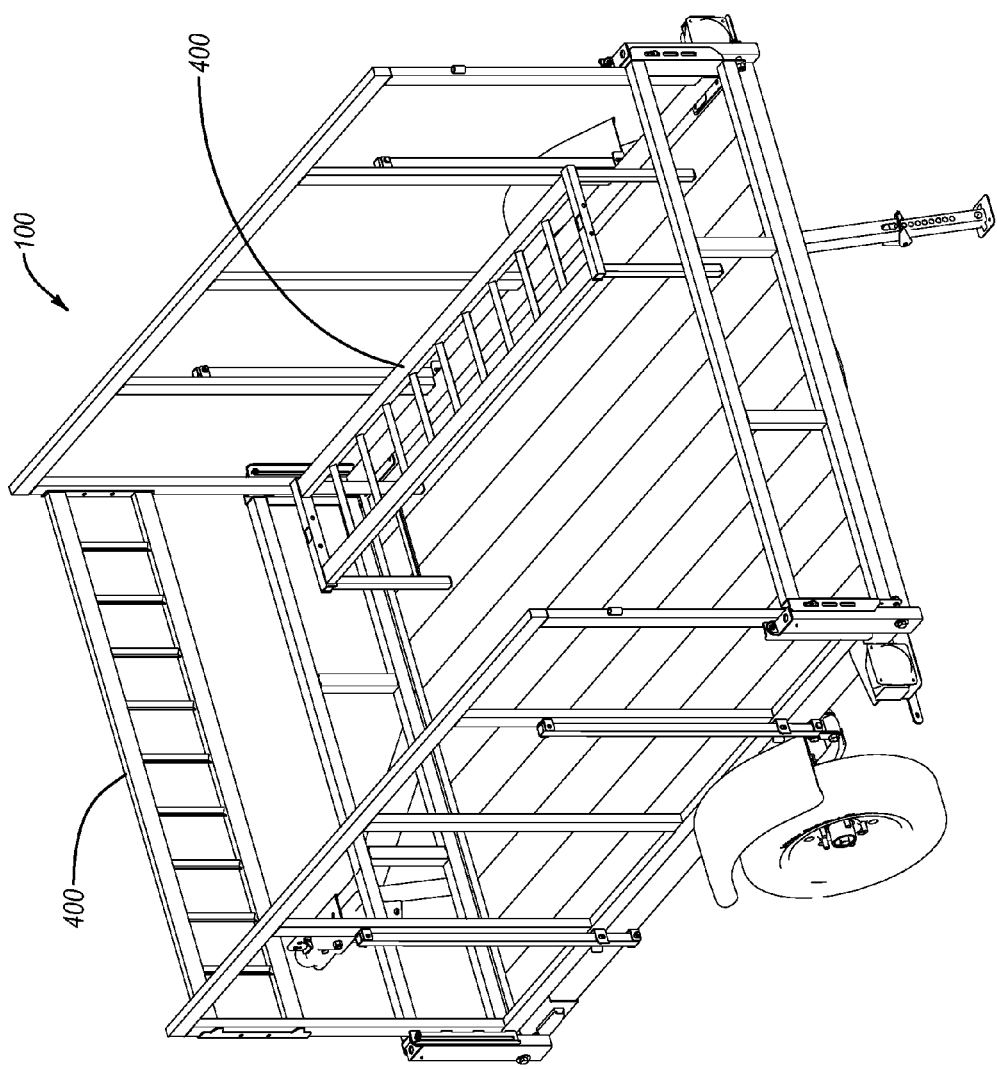
FIG. 16 is a perspective view of an example trailer that includes multi-function wall elements.

With attention, finally, to FIG. 16, details are provided concerning an embodiment of a trailer 100 that includes multi-function wall elements 400. As FIG. 16 discloses other elements already disclosed herein, those elements are not addressed in detail here. In general, the multi-function wall elements 400 may, for example, serve as part of the trailer 100 in some trailer configurations, such as the utility trailer configuration disclosed herein. In addition to such functionality, the multi-function wall elements 400 may also serve other functions when detached from the trailer 100, or at least when not employed as part of the trailer 100. As illustrated in FIG. 16 for example, one of the multi-function wall elements 400 serves as part of an end wall of the trailer 100, while the other multi-function wall element 400 serves as a bench and/or step positioned in the trailer 100.

In general, the multi-function wall elements 400 may be constructed of materials similar to, or the same as, those used for other elements of the trailer 100, as described elsewhere herein. One or more multi-function wall elements 400 may be releasably connected to the trailer 100 by any suitable mechanism, such as a locking mechanism or retention mechanism for example. In this way, the multi-function wall elements 400 can be easily positioned on the trailer 100, and subsequently removed from the trailer 100 if necessary.

While the illustrated multi-function wall units 400 are indicated as having a ladder configuration, the scope of the invention is not so constrained. Rather, the multi-function wall units 400 can have any other configuration suited to the various functions for which they may be used.

Operational Aspects of Some Example Embodiments

With continued attention to the Figures, selected operational aspects of some example embodiments will be addressed in further detail. In FIG. 1, the panel 200 is in the substantially vertical position, and secured into position relative to the bed frame 102, as disclosed elsewhere herein. To move the panel 200 to another position, such as a substantially horizontal position for example, a user may unlock the panel 200 from the bed frame 102. This unlocking may involve, among other things, the operation of a securing mechanism, removal and/or repositioning of one or more pins, such as pin 104B for example, and/or other processes disclosed herein.

When the panel 200 is unlocked from the bed frame 102, the panel 200 can then be rotated from the substantially vertical position of FIG. 1 toward the substantially horizontal position of FIGS. 12-15. Various intermediate positions of the panel 200 are disclosed in FIGS. 6-11, for example. As previously explained, the track piece(s) 204, in cooperation with the pin(s) 104A, enable the aforementioned rotation of the panel 200. The track piece(s) 204, in cooperation with the pin(s) 104A, also enable the panel 200 to translate through a range of motion defined by the slot(s) 204A defined by the track piece(s) 204. Thus, in some embodiments, the panel 200 may be simultaneously rotated and translated to the extent necessary to permit the panel 200 to assume the substantially horizontal position disclosed, for example, in FIG. 3. As disclosed in FIGS. 8 and 9, the length of the slot(s) 204A defines the maximum horizontal extension of the panel relative to the bed frame 102. As also disclosed in FIGS. 8 and 9, the slots(s) 204A are configured and arranged to also permit some vertical movement of the panel 200.

As the panel 200 rotates from the substantially vertical position toward the substantially horizontal position, the braces 300 move in unison with the panel 200. In some embodiments, this motion of the braces 300 is enabled by rotatable connections between the brace 300 and the bed frame 102 and/or panel 200. When the panel 200 has assumed the substantially horizontal position, the braces 300 are positioned to support the panel 200, as indicated in FIGS. 12-15 for example. In some instances, the weight of the panel 200 may be adequate to substantially retain the panel 200 in the substantially horizontal position. In some embodiments however, a retention mechanism may be provided that can be used to retain the panel 200 in the substantially horizontal position until it is desired to move the panel 200 to another position.

Finally, in some embodiments, the pin(s) 104A associated with a panel 200 may be removable, so as to allow the panel 200 edge that is furthest from the trailer to contact the ground. Thus arranged, that panel 200 may serve as a ramp from the ground up to the interior of the trailer.

Although this disclosure has been described in terms of certain embodiments, other embodiments apparent to those of ordinary skill in the art are also within the scope of this disclosure. Accordingly, the scope of the disclosure is intended to be defined only by the claims which follow.

What is claimed is:

1. A trailer, comprising:
   a bed frame;
   a first structure connected to the bed frame;
   a second structure connected to the bed frame;
   a first panel connected to the first structure; and
   a second panel connected to the second structure, wherein the first panel is configured to be releasably secured in first and second positions that are different from each other so as to at least partially define respective first and second configurations of the trailer, the first configuration being different from the second configuration, wherein the first panel is operable, while moving between the first and second positions, to rotate about an axis of rotation defined by the trailer, the axis of rotation being substantially parallel to first and second opposing edges of the panel, and wherein a location of a center of rotation of the panel about the axis of rotation is variable.

2. The trailer as recited in claim 1, wherein one or both of the first and second panels is a side panel.

3. A trailer, comprising:
   a bed frame;
   a first structure connected to the bed frame; and
   a first panel connected to the first structure, wherein the first panel is configured to be releasably secured in two different positions so as to at least partially define first and second configurations of the trailer, the first configuration being different from the second configuration, and wherein the first panel is operable to rotate about an axis of rotation defined by the trailer, the axis of rotation being substantially parallel to first and second opposing edges of the panel, and wherein a distance between the axis of rotation and the first and second edges of the first panel is variable.

4. The trailer as recited in claim 1, wherein at least one of the first and second panels is configured to rotate through a range of motion of no more than about 90 degrees.

5. The trailer as recited in claim 1, wherein when the trailer is in the first configuration, the first and second panels are generally parallel to each other so as to form side walls of the trailer.

6. The trailer as recited in claim 1, wherein when the trailer is in the second configuration, one or both of the first and second panels lie in a plane generally parallel to, and spaced apart from, a plane in which the bed frame lies.

7. The trailer as recited in claim 1, further comprising one or more movable braces connected to the first panel and to the bed frame, and the one or more movable braces configured to facilitate retention of the first panel in a substantially horizontal position.

8. A trailer, comprising:
   a bed frame;
   a first set of upright members connected to the bed frame;
   a second set of upright members connected to the bed frame;
   a first side panel connected to the first set of upright members, wherein the first side panel is movable between generally perpendicular and generally parallel positions relative to the bed frame, and wherein the first side panel is configured to be releasably secured in each of those positions;
   a second side panel connected to the second set of upright members, wherein the second side panel is movable between generally perpendicular and generally parallel positions relative to the bed frame, and wherein the second side panel is configured to be releasably secured in each of those positions, wherein:
      upon initial rotation of a selected one of the side panels from the generally perpendicular position toward the generally parallel position, a lower end of the selected side panel is positioned within an interior of the trailer, the interior of the trailer being defined in part by the bed frame; and
      the lower end of the selected side panel is retracted from the interior of the trailer as that side panel moves into the generally parallel position; and
   means for repositioning, wherein the means for repositioning enables simultaneous translational and rotational motion of one of the side panels.

9. The trailer as recited in claim 8, wherein the means for repositioning enables the first side panel to both rotate and translate when moving between the generally parallel and generally perpendicular positions.

10. The trailer as recited in claim 8, wherein the means for repositioning enables the position of the first side panel to be changed between the substantially perpendicular position and the substantially parallel position.

11. The trailer as recited in claim 8, wherein the means for repositioning comprises a pin and a track piece, the track piece being connected to an end of the first side panel and defining a slot within which the pin is received, the pin being connected to an upright member of the first set of upright members, and the trailer further comprises:
   a brace having a first end and a second end, the brace being rotatably connected at the first end to the first panel, and rotatably connected at the second end to the bed frame.

12. The trailer as recited in claim 8, further comprising a securing mechanism configured to retain one of the panels in the generally perpendicular position.

13. The trailer as recited in claim 1, further comprising:
   a tow hitch connected to the bed frame;
   an axle; and
   a pair of wheels mounted on the axle and cooperating with the axle to support the bed frame.

14. The trailer as recited in claim 1, wherein the trailer defines a linear range of motion of the first panel, and the linear range of motion defines the extent to which the location of the center of rotation of the first panel can be varied.

15. The trailer as recited in claim 14, wherein the first panel, when moving between the first and second positions:
   rotates about the axis of rotation; and
   moves linearly within the defined linear range of motion.

16. The trailer as recited in claim 1, wherein one of the side panels comprises one of: expanded metal, sheet metal, diamond plate, blow-molded plastic, foam, wood, plastic, rubber, and composite material.

17. The trailer as recited in claim 1, further comprising a plurality of bed members that cooperatively define a bed supported by the bed frame.

18. The trailer as recited in claim 15, wherein, as the first panel moves between the first and second positions, the first panel simultaneously rotates about the axis of rotation and moves linearly within the defined linear range of motion.

19. The trailer as recited in claim 1, wherein the first structure comprises first and second upright members connected to the bed frame proximate respective corners of the bed frame, and the second structure comprises third and fourth upright members connected to the bed frame proximate respective corners of the bed frame.

20. The trailer as recited in claim 1, further comprising a movable brace connected to the first panel and to the bed frame, the movable brace configured to remain connected to the first panel regardless of the position of the first panel.

21. A trailer, comprising:
   a bed frame;
   a first side panel connected to the bed frame, wherein the first side panel is movable between generally perpendicular and generally parallel positions relative to the bed frame, and wherein the first side panel is configured to be releasably secured in each of those positions;
   a second side panel connected to the bed frame, wherein the second side panel is movable between generally perpendicular and generally parallel positions relative to the bed frame, and wherein the second side panel is configured to be releasably secured in each of those positions;
   means for repositioning, wherein the means for repositioning enables the position of the first side panel to be changed between the generally perpendicular and generally parallel positions, and wherein the means for repositioning comprises a pin and a track piece, the track piece being connected to an end of the first side panel and defining a slot within which the pin is received;
   an upright member attached to the trailer proximate a corner of the trailer, and the pin being connected to the upright member; and
   a brace having a first end and a second end, the brace being rotatably connected at the first end to the first side panel, and rotatably connected at the second end to the bed frame.

22. The trailer as recited in claim 3, wherein
   the first structure includes first and second upright members connected to the bed frame proximate respective corners of the bed frame, and the first structure defines the axis of rotation about which the first panel rotates.

* * * * *

UNITED STATES PATENT AND TRADEMARK OFFICE
CERTIFICATE OF CORRECTION

| | | |
|---|---|---|
| PATENT NO. | : 8,590,962 B2 | Page 1 of 1 |
| APPLICATION NO. | : 13/360959 | |
| DATED | : November 26, 2013 | |
| INVENTOR(S) | : Nye et al. | |

It is certified that error appears in the above-identified patent and that said Letters Patent is hereby corrected as shown below:

In the Specification

<u>Column 7</u>
Line 41, change "arranged to with" to --arranged to align with--

Signed and Sealed this
Thirtieth Day of June, 2015

Michelle K. Lee
*Director of the United States Patent and Trademark Office*